United States Patent
Branscome

(10) Patent No.: US 10,545,959 B2
(45) Date of Patent: Jan. 28, 2020

(54) METHOD AND A SYSTEM FOR EFFICIENT DATA SORTING

(71) Applicant: Jeremy L. Branscome, Santa Clara, CA (US)

(72) Inventor: Jeremy L. Branscome, Santa Clara, CA (US)

(73) Assignee: Teradata US, Inc., San Diego, CA (US)

( * ) Notice: Subject to any disclaimer, the term of this patent is extended or adjusted under 35 U.S.C. 154(b) by 537 days.

(21) Appl. No.: 15/384,431

(22) Filed: Dec. 20, 2016

(65) Prior Publication Data

US 2017/0235814 A1    Aug. 17, 2017

Related U.S. Application Data

(60) Provisional application No. 62/270,619, filed on Dec. 22, 2015.

(51) Int. Cl.
*G06F 16/2453* (2019.01)
*G06F 16/2455* (2019.01)

(52) U.S. Cl.
CPC .. *G06F 16/24532* (2019.01); *G06F 16/24558* (2019.01)

(58) Field of Classification Search
USPC ........................................................ 707/737
See application file for complete search history.

(56) References Cited

U.S. PATENT DOCUMENTS

| 6,484,179 B1* | 11/2002 | Roccaforte | G06F 16/30 707/737 |
| 6,571,285 B1* | 5/2003 | Groath | H04L 41/0631 370/352 |
| 2012/0323923 A1* | 12/2012 | Duan | G06F 16/24554 707/741 |
| 2013/0218840 A1* | 8/2013 | Smith | G06F 11/1446 707/639 |

OTHER PUBLICATIONS

Branscome, Jeremy L., "HW (Sorted) Merge Sort Approach", NPL document, Apr. 2014., 1.
Branscome, Jeremy L., "HW Wide-Key Sort Approach", NPL document, Apr. 2014., 1.

* cited by examiner

*Primary Examiner* — Cam Linh T Nguyen
(74) *Attorney, Agent, or Firm* — Schwegman, Lundberg & Woessner, P.A.

(57) ABSTRACT

Methods and an apparatus for data sorting is provided. Keys are derived from a data set and a mapping function is obtained for sorting the data set in accordance with the mapping function. A wide key sort on the keys is performed over a plurality of distributed nodes using the mapping function, resulting in sorted lists of rows from the data set produced in parallel from the nodes with each row associated with a unique one of the keys pushed to a stack machine. The sort process is an ordered row traversal from the stack machine.

20 Claims, 8 Drawing Sheets

METHOD AND A SYSTEM FOR EFFICIENT DATA SORTING

RELATED APPLICATIONS

This is a non-provisional application which claims the benefit of priority to U.S. Provisional Application No. 62/270,619, entitled "Method and Apparatus for Efficient Data Storing;" filed on Dec. 22, 2015, the disclosure of which in its entirety is incorporated by reference herein.

BACKGROUND

Sorting data is a common problem in the big data applications space. Sorting implementations can suffer from significant limitations in practice, particularly when built from dedicated hardware (HW), but also when implemented in software (SW), where both may ultimately be subject to strict area and power constraints, relative to the scalability of critical sort capabilities. For example, a vectorized (SIMD) SW implementation of a sort algorithm is at least implicitly constrained by the vector HW core's own micro architectural limitations (only finite core HW, vector width, operational frequency & power curves, etc.), as much as a dedicated HW solution may be gate-limited in an FPGA or ASIC, forcing difficult tradeoffs that can affect not just the overall applicability of the practical implementation, but even, effectively, of the algorithm itself. Such limitations are often manifested in bounded sort key width, a characteristic fundamental to the breadth of problems the algorithm may solve.

DETAILED DESCRIPTION

Figure 1:
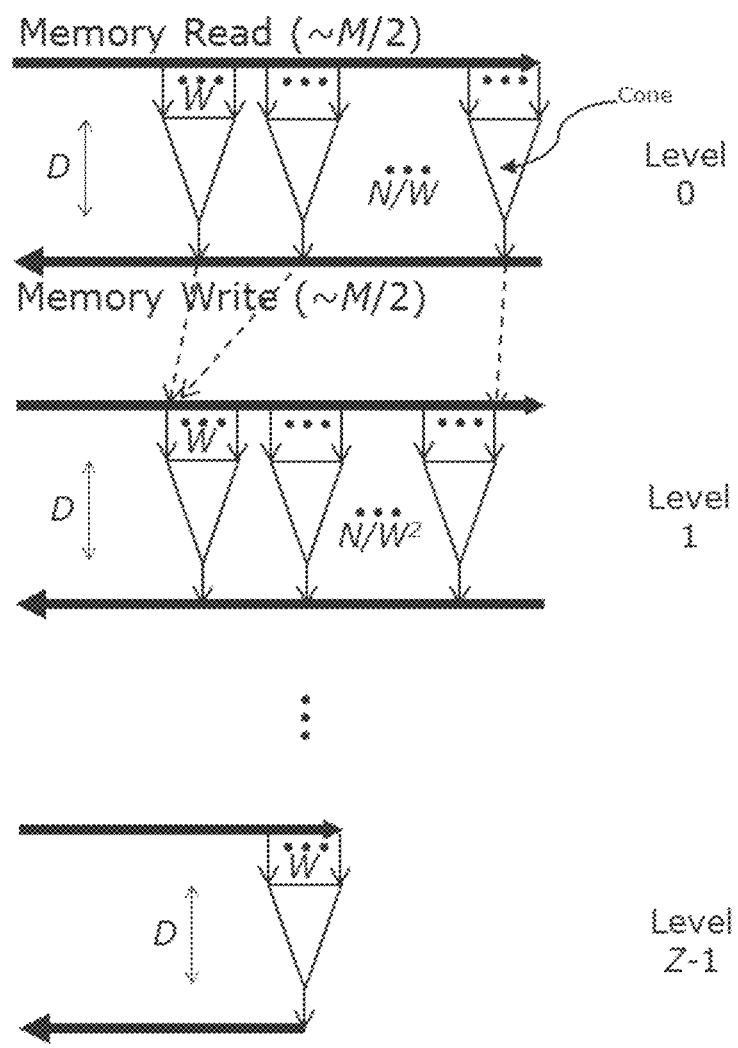
FIG. 1 depicts a HW wide key sort technique, according to an embodiment.

Various embodiments depicted herein are implemented as one or more software modules, which are programmed within memory and/or non-transitory computer-readable storage media and executed on one or more processing devices (having memory, storage, network connections, one or more processors, etc.).

The embodiments herein provide, among other things:

A scalable architecture that can be implemented in hardware logic (ASIC/FPGA), or even as software in parallel CPU threads, to effect a sort of small to very large data sets, applicable to data at rest or in flight. Basic properties of scalability and skew tolerance are favorable, for predictable performance, while the technique itself is simple enough to be relatively low cost (in terms of, e.g., resources and routability) in a parallel hardware solution. Indeed this approach exploits what practical custom hardware solutions and multi-threaded software can do best: implement simple distributed parallelism, requiring only small-scale connectivity.

Methods for optimizing utilization and throughput of physical implementation
  Independent parallel implementations can work together for performance scaling, or separately for concurrency
  Maintaining multiple frontiers intra- and inter-level
  Dynamic, and potentially even predictive, data-parallel distribution to mitigate skew
Methods for addressing of input data lists, which may be primarily extrinsic, computed by partition and offset (simple static scheduling)
Methods for optimizing scalability and resource requirements
  Performing multi-buffering vs. in-situ may be included (storage)
  Naturally amenable to block compression schemes
  Time & resource scaling O(N log N), with implementation resource scaling being effective, but also optional (flexible scalability)
Methods for reducing latency, e.g. for small data sets, may be included (latency vs. throughput)
No special hardware vendor dependencies—circuitry fundamental enough to be supported anywhere (fundamental)
Storage requirements O(N), making this efficiently applicable to data at rest problems, while also supporting data in flight in various topologies, including but not limited to dataflow and streaming architectures (extended system architectures & topologies)

Moreover the methods and apparatuses presented herein provide for: sorting of data sets small to large and efficient extension of core (primitive) sorting algorithms & implementations with limited scaling of key width.

Still further the techniques presented herein provided for
Method and apparatus to extend the key-width scale of a given sort algorithm
  Many orders of magnitude extension
  Efficient for HW area, power, and
  Storage (including potential memory space) costs
Focus on localized and pipelined-parallelism
  Optimizes throughput performance
  Aligns with strengths of highly parallel implementations in HW and SW
  Admits iterative approaches, as well, in a flexible and adaptive fashion, depending on resource availability, etc.
Efficient result data structures
  Help minimize storage/memory requirements
  Amenable to a simple compression scheme (included)
  May be built and traversed efficiently by parallel processes
Generalized to increase applicability
  Key Domain mapping may vary by application, supporting different notions of key & row space
  Hash mapping may vary by application, to control ultimate sorting semantics
  Admits statistical approaches to characterize performance expectations, which may be further extended
Networked, streaming, and dataflow-oriented implementations are enabled particularly by pipelined-parallelism, as the overall process may be distributed over custom HW chips, cores, processors, nodes, systems, etc.

Figure 2:
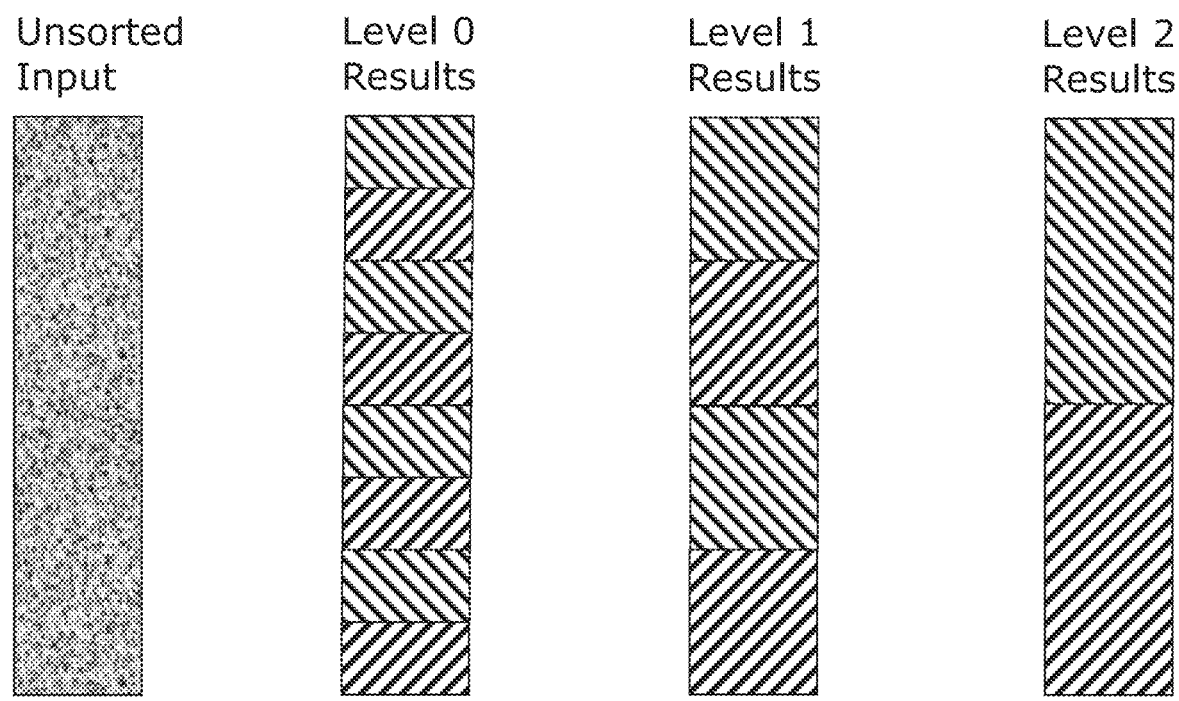
FIG. 2 graphically depicts results from a HW wide key sort technique, according to an example embodiment.
Figure 3A:
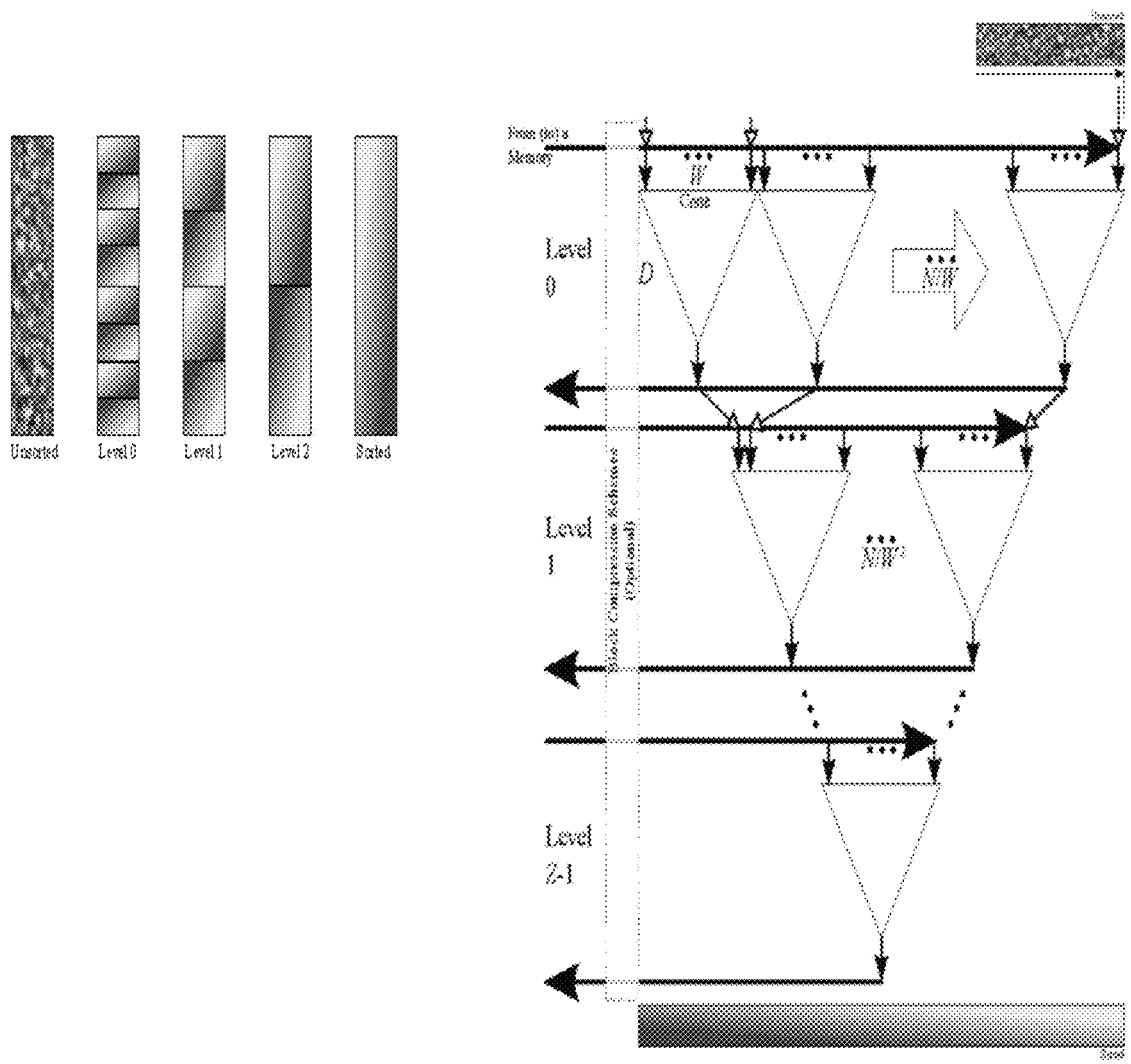
FIGS. 3A-3B depicts processing levels for a HW wide sort technique, according to an example embodiment.
Figure 3B:
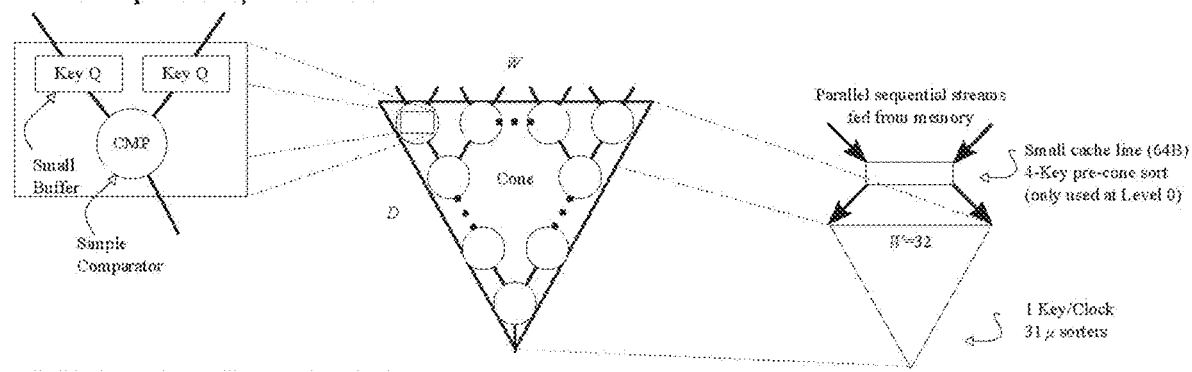

In an example, implementation the following constraints and assumptions are assumed. It is noted this is modifiable and customizable based on the situation.
Local Constraints
  Simplified localized TeraSort (TERADATA®, Inc.)
  Cardinality, N=1B Key space, 10-byte
Tuple size, K=10-byte key+6-byte value=16 bytes
Stability (waived)
Assumptions
  Memory capacity>=2*K*N (e.g. 32 GB)
  Memory BW (M)
Sustainable and Consistent for Thousands of Streams
  Core throughput (T=Keys/s)
T is a function of many variables, including K, algorithms, network, PE arch, . . . .
The Approach in the example implementation is as follows with reference to the FIGS. 1-2.
Approach
  Multi-pass, deep merge sort network (tree)
    Each network node (PE?) capable of performing localized merge sort at throughput T
    Increased depth minimizes total number of levels & minimizes memory BW dependency (i.e. mitigates memory BW bound)
  Key factors in assumptions
    Node results must traverse internal network efficiently otherwise, potential for cumulative penalties to effective T
    Multiple passes must be scheduled to maximize network utilization
    Dead time diminishes effective T
    T must not limit the network
      T>M (remain consistently Memory BW bound)
      That is the time to do a key comparison and emission is always faster than memory RW time
    Thousands of independent sequential memory streams sustainable at optimal rate
      Generally not a trivial assumption, in terms of practical queuing latencies, contention, etc. on a memory fabric
      Susceptibility to issues can diminish overall performance substantially
Merge Sort Tree
  Each cone
    Fixed dimensions, variable input length
    Binary merge sort network in core
    One "pass" with W inputs of key lists
      Length (L) of each input list depends on Level number i (0<=i<Z)
      $L=W^i$
    Throughput T
    Depth of cone $D=\log_2(W)+1$
    Number of m-nodes (PEs?) in cone
      $2^{(W+1)}-1$ (not illustrated)
  Entire tree (after all passes)
    Number of levels $Z=\text{ceil}(\log_2(N)/D)$
    Each level ends up reading all N keys, for complexity
      Z*N=N ceil(log(N)/D)=N ceil(log(N)/(log(W)+1))
    Space complexity is 2N
      Alternate memory buffer O(N) each level
  Total time
    N*Z*K/(M/2)
  Key rate R
    R=N/(N*Z*K/(M/2))=M/(2*K*Z)=M/(2*K*ceil(log(N)/(log(W)+1)))
  Practical adjustment
    64-byte DRAM line packs 4 keys
    So $L=C*W^i$ where C~4
    Implies very first level of first-level cone must sort (mod 4) keys together, prior to beginning conventional merge sort
    Slight asymmetry of first-level cone, and T loss, but probably not too bad
    All outputs>4 keys, so pack normally
Merge Sort Data Perspective
  Binary progression per level
    Alternating blocks (lists) of locally sorted results, where block size (=L) increases
    Final block is size L=N (pad accordingly) and results are complete
  Alternating memory buffer 2N is simple way to produce/consume
Examples Assumptions
  Example
    M~=46 GB/s (4 channels DDR4@ 1800, de-rating 20% for inefficiencies)
    $W=2^{10}$
      So D=11
      Total m-nodes per cone=2047
    R~450 M/s
    No more than ~450/64=7× performance over x86 approach
    Probably need 4 channels DDR4@ 2400 to reach (max) 10× performance
    Note: Does not account for future x86 rate running with like DRAM
      Could be less than 10× improvement
    Another way may be to increase $W \rightarrow 2^{14}$ (core costs?>=32K m-nodes (>PEs?))
  Again assumes
    Key packing makes first level slightly asymmetrical, possibly smaller T
    High per-pass efficiency
    Memory BW bound ($>=2^{10}$ independent input lists stream optimally)
      Generally non-trivial assumption (queuing latencies, contention, etc. can have huge impact)
    PEs can be clustered to form 2047 m-nodes within cone
    Internal flow is non-limiting through tree
The FIGS. 3A-3B are now discussed as embodiments, presented herein for the hardware sorted merge approach.
Address space partitioned statically, extrinsically in powers of 2, with optional stride, fetched in W lists per physical cone implemented. List length: $L=W^i$ for level iCone depth: $D=\log(W)$Number of levels: $Z=\lceil \log(N)/D \rceil \mu$ sorter throughput: TMemory BW: M (subject to interface-dependent 2×)
Key size: K
Each Level sees N elements
Total comparisons O(N log N)
Generally skew-tolerant. Stability implementation choice (determinism), inexpensive either way
Amenable to block compression schemes. Inter-Level Memory may be structurally distinct (extended system topologies)
Simple time bound: N·Z·max(1/T, K/M)
Memory complexity: 2N (in-situ is plausible at ~N) (compression would reduce by factor)
Example Physical Implementation: Assume 2×32-Cones handling 16-byte Keys@200 MHz sorting total 220 keys. Assume small cache line (64B) 4-Key pre-cone sort (≥1 Key/Clock) only used for Level 0.
Multiple sort frontiers maintained through pipelining to maximize utilization of Cone intra- and inter-Levels. Naturally exploits localized parallelism and connectivity, favoring HW factors such as routability and resource costs.
Lower bound on time: $2^{20}[3/(2*200 \ 10^6)+1/(200 \ 10^6)]=$ 13.1 ms Required Memory BW (Max):$2*(16*200 \ 10^6)=$ ~6.4 GB/s per direction, 3 of 4 Levels Example (est.)

resource requirements (for cones alone):32*6*16*8=24K Flops/cone (48K total)(Compare 1×64-Cone at 15.7 ms, same area)

The FIGS. 4A-5D provide additional depiction of the HW wide-key sort approach discussed herein.

Specifically, an implicit key domain is induced from original data set D (as shown in the FIG. 4A), which assumes a meaningful row space, of which r is an element, and mapping function f(r). Note that f(.) as noted in the FIGS. 4A-4D implicitly includes D in its domain. "Wide key" denotes keys wider than a primitive sort capability. The sorted output are keys but could also be represented indirectly by, for example, row identifiers of the original row space.

Figure 4A:
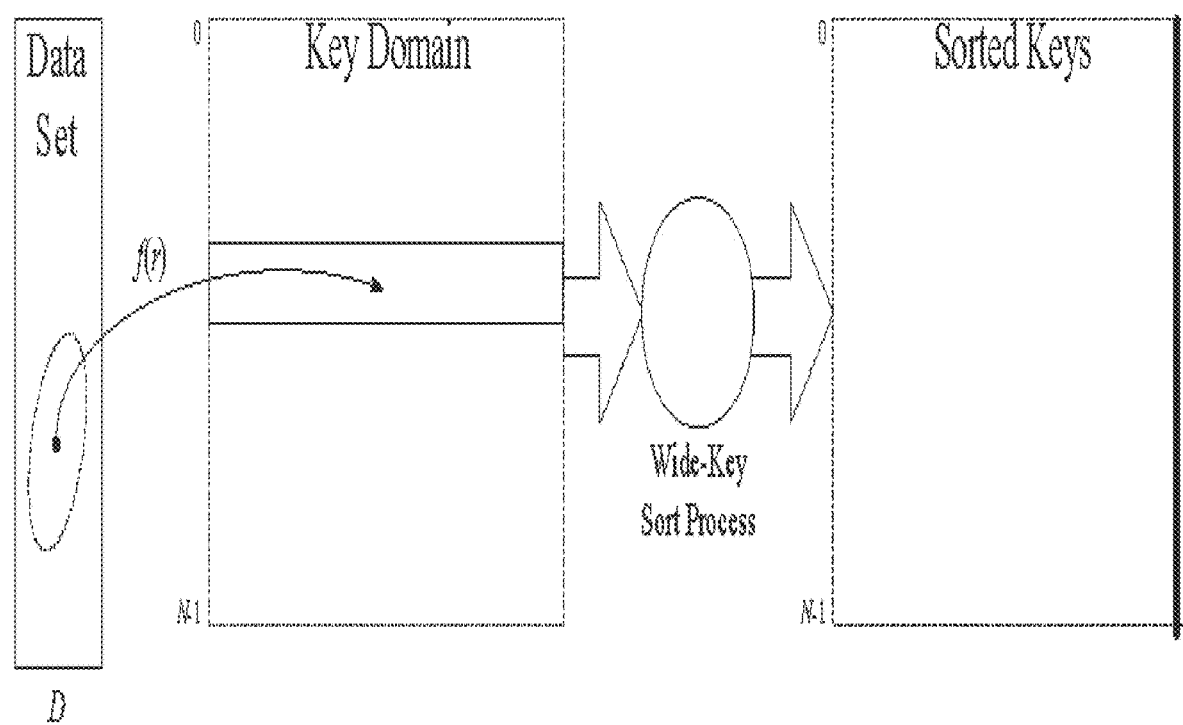
FIGS. 4A-4D depicts a more detailed view of different levels of granularity for a HW wide sort technique, according to an example embodiment.
Figure 4B:
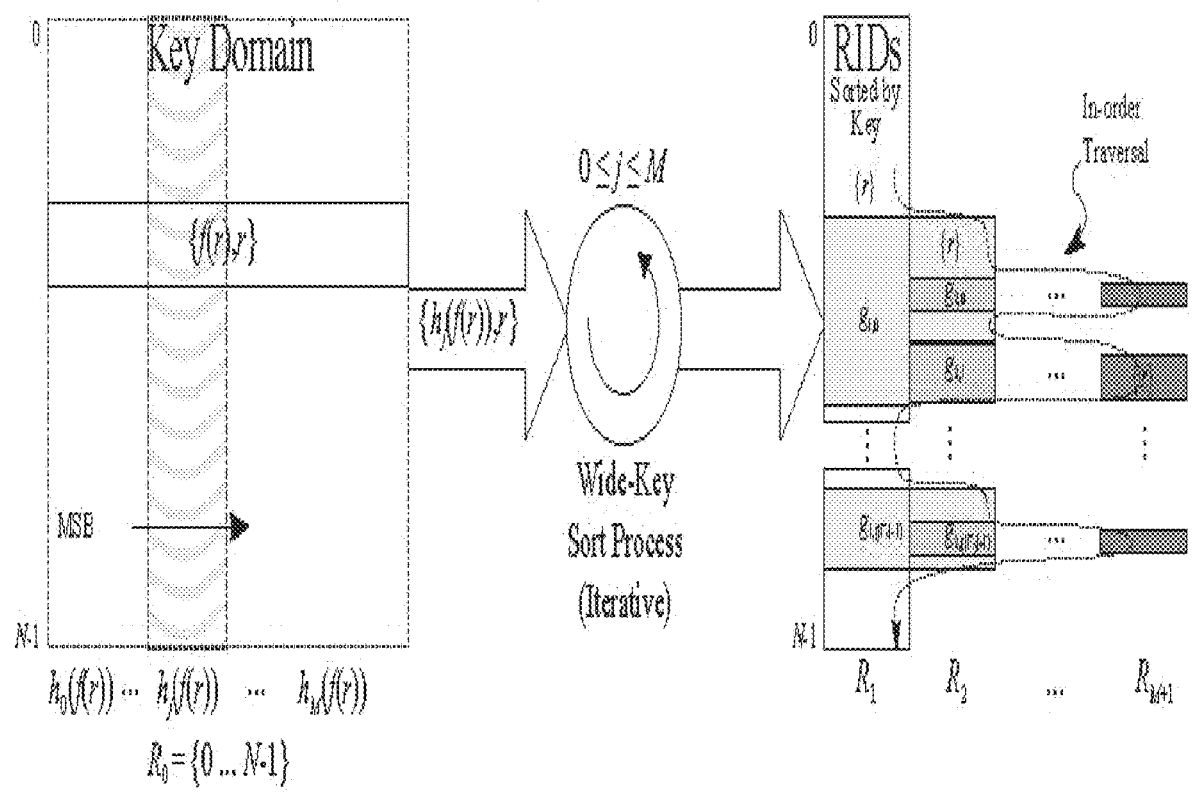

In the FIG. 4B, the Key Domain includes original row space association (r). Wide-key sort process iterative, ala radix, over key hashes $h_j(.)$, which may be, e.g., a simple window from Most-Significant Bit (MSB) to Least-Significant Bit (LSB), depending on application. Results, conceptually, are lists $R_j$ composed of row identifiers sorted according to original key order, for distinct keys in $h_{j-1}$ (.) for non-distinct keys, a group identifier ($g_{j,i}$ usually consecutive starting from 0) is assigned, in directing to next list $R_{j+1}$. Effectively fixed-point recursion, until all keys are distinct (up to iteration M) where M is bounded proportional to key width but may be minimized by this adaptive approach. In-order traversal beginning with $R_1$ gives sorted result.

Figure 4C:
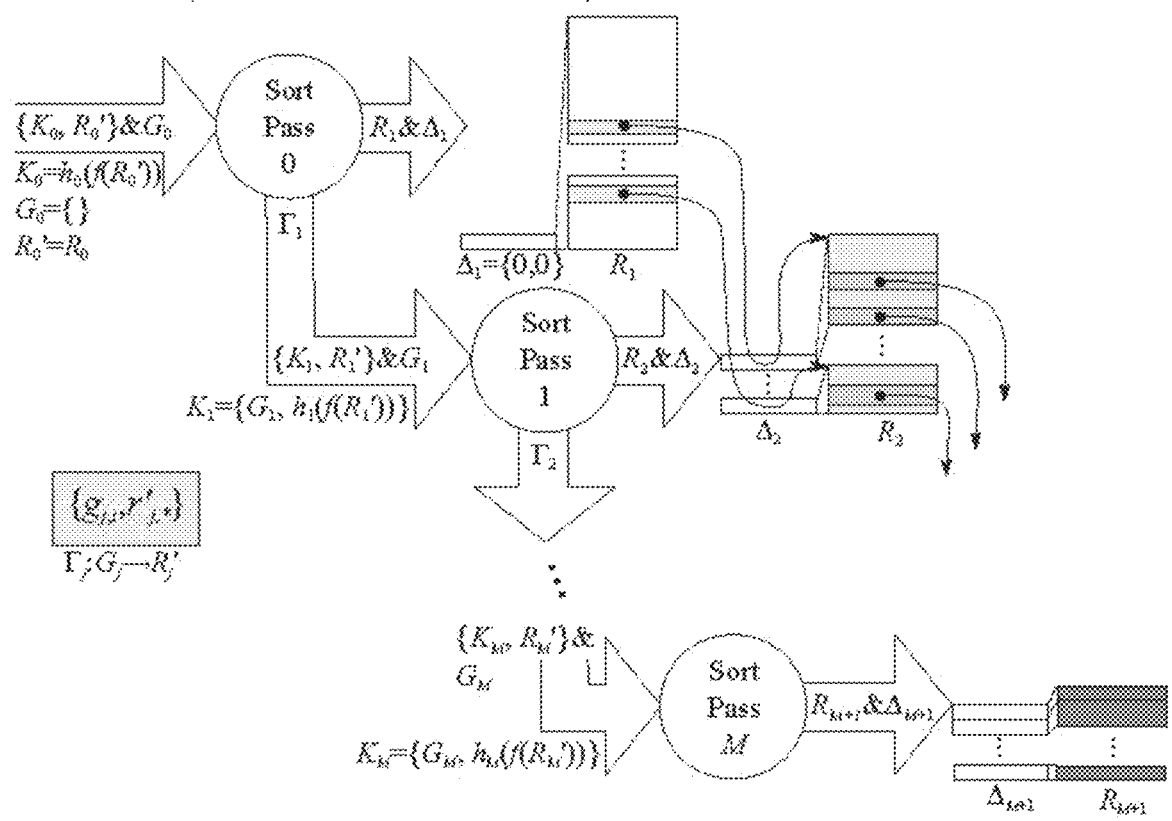

In the FIG. 4C, iterative sort passes essentially unroll in pipeline-parallelizable form, as individual groups are established. $K_j$ is a list of input sort keys, generally denoted as $K_j=\{G_j, h_j(f(R_j'))\}$, with $G_0$ empty. $T_j$ is a mapping of group identifiers ($g_j$), implicit in to original row space, which corresponds with the row identifiers of non-distinct keys ($R_j'$) from pass j−1. Note the $G_j$ may be represented in various ways, e.g., as literal values, repeating one for each non-distinct key's RID in a group, or as a single delimiter qualifying a subset of row identifiers (a subset of $R_j'$). $G_j$ is a list of group identifiers implicit in $R_j$, comprising the mapping $I_j'$. $R_j'$ is a list of Row Identifiers (RIDS) from the original row space, where prime indicates RIDS corresponding with the row identifiers of non-distinct keys identified in pass j−1. $R_j$ is a list of result elements, each of which may be either 1) RID from the original row space (sorted by the original Key Domain), or 2) group size and offset reference into $R_{j+1}$. Note that group identifier may be implicit and consecutive, starting from 0 on each pass. Note also that the initial list $R_0=\{0 \ldots N-1\}$, is trivial and may be implicit in the implementation. The depicted triangle with the sub-j is a mapping of group identifiers implicit in $R_{j-1}$ to two values, an arithmetic adjustment of group offset and size, as the group occurs in list $R_j$. Note that adjustment sets are an optional space optimization for packing group output. The final result induced by in-order traversal of sorted lists $\{R_1, R_2, \ldots R_{M+1}\}$, in the manner of a stack machine, following group size and offset into successive lists, beginning at the start of $R_1$. Group offset and size adjustments (depicted triangle sub-1 through depicted triangle sub-M+1), if implemented are utilized at each transition from $R_j$ to $R_{j+1}$; transitions from $R_{j+1}$ to $R_j$ occur according to size and current stack machine trace.

Figure 4D:
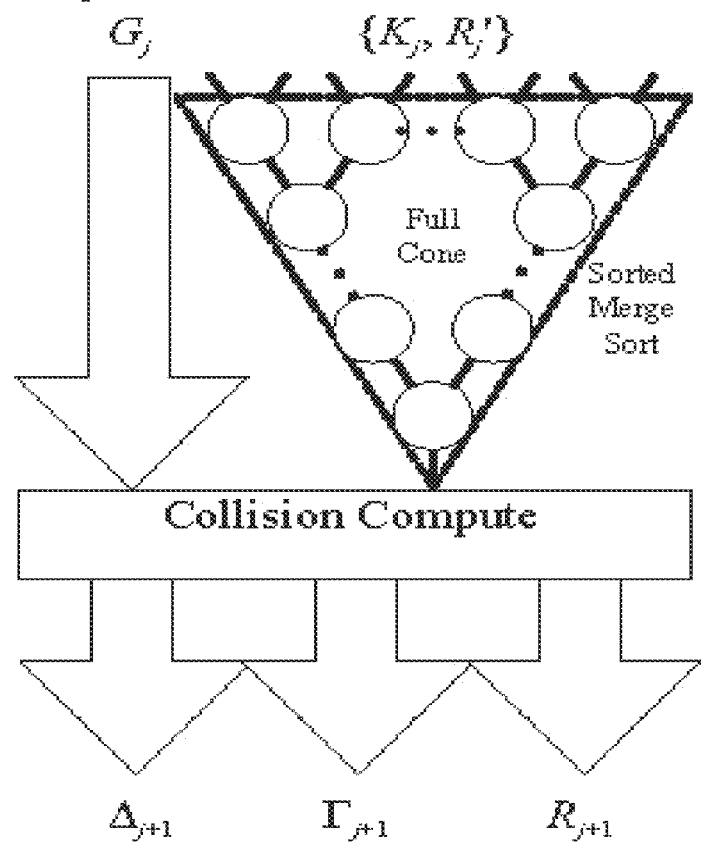

In the FIG. 4D, collision detect and compute processing occurs at the end of each complete sort pass. These processes may proceed in, e.g., a pipelined-parallel fashion having only minor data and control dependencies. The depicted triangle sub-J+1 may or may not be implemented as a space optimization, through the details discussed below assume and also include such space optimization. For every distinct $K_j$, $R_{J+1}$ includes the associated row identifier (RID); non-distinct keys are collected, sized and grouped and a predicted offset into $R_{j+2}$ is based on a (e.g. cumulative) tally. $T_{J+1}$ includes the chosen group identifier mapping to each associated RID in the group of non-distinct keys, which may be implemented by, e.g., a delimiter or a 1:1 mapping. For every distinct group identifier in Gj, the depicted triangle sub-J+1 includes a size and offset adjustment, representing the reduction in size of $R_{j+1}$ due to non-distinct keys in the group being replaced by a size/offset reference and an offset reduction that is the cumulative size reduction over all previous groups in $G_j$, respectively. Note that this means for the first group identifier in $G_j$ (j>0) may have a non-zero size adjustment, but its offset adjustment will always be 0. The depicted triangle sub-1 is formed from the empty $G_0$, includes only the trivial zero size and offset adjustment for its first (and only) group identifier mapping. App processing maintains order of the sorted key input $K_j$, in conjunction with the order input $G_j$ when non-empty (i.e., J>0). Note the sort pass may include $R_j'$ as low-order part of sort key, if stronger determinism is desired or configured in the processing.

The processing depicted in the FIGS. 4A-4D illustrate a number of beneficial features. The sort approach adapts according to redundancy in the Key Domain, minimizing M as much as possible, where the time complexity is proportional both to M and degree of redundancy. Generally, additional parallelism, e.g., additional HW may be employed to mitigate effects of these factors. More may be said of cost-based models, but essentially bounded above by a linear combination of the cost functions, one function per Sort Pass; and below by the maximum of the same. Any such algorithm is subject to statistical properties of Key Domain and original Data Set on which the domain is based increased redundancy generally leads to larger M). For example, information entropy of the Data Set below a certain threshold will correlate with greater redundancy and larger M. Simple, sufficient characterization metric may also be deployed, assuming entropy threshold is insufficient, as this may be dependent on many factures, including the nature of f(.). Moreover, the approach presented provides opportunities for pipelined-parallelism lending to more efficient implementations. Utilizing sequential lists during the sort process permits optimal scheduling of data accesses, where external memory may be in use, while permitting high-level streaming, dataflow, and network-based implementations. Of the sort process, only $h_j(f(.))$ need be random access in nature, which may employ advanced scheduling, caches, etc., to mitigate possible latency. Results are comprised of simple list and mapping structures which allow a stack machine to employ, e.g., advanced scheduling, caches, etc. to mitigate any random access latency in interpreting the final sorted result. Depending on sorting requirements, characteristics of the Key Doman, and Sort Pass implementation, $h_j(.)$ may vary in size varying j, or may traverse the keys in different permutations, e.g., from LSB to MSB, instead of MSB to LSB (numeric vs. text sort, etc.). Similarly, masking may be employed to accommodate, e.g., variable-length keys. Low-level sort is depicted as a full cone of "Sorted Merge Sort," which is one implementation possibility, alternative sort primitives are supported all the same. $R_j$ size and offset components, and their respective adjustments (depicted triangle sub-j), may be represented in many ways, the simplest being small fixed-width integers (e.g., consistent with RID size) with a delimiter bit, adjustments being signed or unsigned by convention.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
deriving keys from a data set creating a key domain, each key associated with a particular row of the data set;
obtaining a mapping function for delivering a sort order of the keys;
processing a distributed wide-key sort process on the keys using the mapping function by distributing the data set over nodes of a network, each node having access to the key domain and the mapping function for performing the wide-key sort process on a unique portion of the data set distributed to that node; and
providing the sort order as output of the distributed wide-key sort process in row order based on the sorted keys returned from the nodes.

2. The method of claim 1, wherein processing further includes iteratively performing the wide-key sort process against the data set.

3. The method of claim 2, wherein iteratively performing further includes recursively performing the wide-key sort process.

4. The method of claim 3, wherein recursively performing further includes pushing results from each recursive iteration onto a stack.

5. The method of claim 4, wherein providing further includes obtaining from a top of the stack the sort order in the row order as the results are popped from the stack.

6. The method of claim 1, wherein processing further includes processing key hashes on the keys during the wide-key sort process.

7. The method of claim 6, wherein processing further includes processing the key hashes as most significant bits (MSB) to least significant bits (LSB) on the keys.

8. The method of claim 1, wherein processing further includes providing the output from the wide-key process as lists of the rows comprised of row identifiers for the rows.

9. The method of claim 1, wherein providing further includes providing the row identifiers from each of the nodes with each node providing a subset of the row identifiers sorted in original key order.

10. The method of claim 1, wherein providing further includes providing within the subset from each node unique keys and non-unique keys as a group identifier representing the non-unique keys.

11. A method, comprising:
distributing a data set over nodes of a network with a key domain comprising key lists derived from the data set along with a mapping function for sorting rows of the data set, each key within the key lists identifying a particular row of the data set, each node performing the sorting on that node's portion of the data set;
iterating by each node a unique portion of the data set using the key lists and the mapping function to order a portion of the rows in a sort order defined by the mapping function; and
traversing the merged output from the nodes in a row order traversal to obtain the sort order for the data set.

12. The method of claim 11, wherein providing further includes providing each node with access to the key domain and the key lists.

13. The method of claim 11, wherein iterating further includes performing recursion by each of the nodes to iterative produce that node's portion in the sort order.

14. The method of claim 11, wherein iterating further includes grouping non-unique keys as a group of rows during each nodes processing of that node's portion.

15. The method of claim 14, wherein grouping further includes assigning by each node an offset from a first row of the group to a last row of the group.

16. The method of claim 11, wherein iterating further includes maintaining an updated sort order by each node during each node's iteration.

17. The method of claim 16, wherein maintaining further includes maintaining the sort order as a list of specific keys by each node during each node's iteration.

18. The method of claim 11, wherein iterating further includes pipelining different portions of the data set to the nodes for parallel processing by the nodes and level processing.

19. A system, comprising:
a set of distributed processing nodes; and
a wide-key sort process configured to execute as an instance in parallel with other instances of the wide-key sort process on the nodes, each instance configured to produce a sort order on a data set by iterative processing key lists having keys and a mapping function defining the sort order, each instance performing the wide-key sort process on that instance's unique portion of the data set, each key associated with a particular row of the data set.

20. The apparatus of claim 19, wherein each instance is further configured to perform the iterative processing as a recursive process.

* * * * *